United States Patent
Elsey

(10) Patent No.: US 9,002,496 B2
(45) Date of Patent: Apr. 7, 2015

(54) 3D PRINTING ON A ROTATING CYLINDRICAL SURFACE

(75) Inventor: Justin Elsey, St Peters (AU)

(73) Assignee: Zydex Pty Ltd, St. Peters (AU)

( * ) Notice: Subject to any disclaimer, the term of this patent is extended or adjusted under 35 U.S.C. 154(b) by 508 days.

(21) Appl. No.: 13/387,720

(22) PCT Filed: Jul. 29, 2010

(86) PCT No.: PCT/AU2010/000946
§ 371 (c)(1),
(2), (4) Date: Mar. 7, 2012

(87) PCT Pub. No.: WO2011/011818
PCT Pub. Date: Feb. 3, 2011

(65) Prior Publication Data
US 2012/0165969 A1 Jun. 28, 2012

(30) Foreign Application Priority Data

Jul. 29, 2009 (AU) ................................. 2009903526
Jul. 31, 2009 (AU) ................................. 2009903574

(51) Int. Cl.
*G06F 19/00* (2011.01)
*B29C 67/00* (2006.01)

(52) U.S. Cl.
CPC ......... *B29C 67/0059* (2013.01); *B29C 67/0085* (2013.01)

(58) Field of Classification Search
USPC .............................. 700/120; 264/401; 425/375
See application file for complete search history.

(56) References Cited

U.S. PATENT DOCUMENTS

| | | | |
|---|---|---|---|
| 6,261,507 B1 * | 7/2001 | Gigl et al. | 264/401 |
| 6,622,062 B1 * | 9/2003 | Earl et al. | 700/193 |
| 6,907,307 B2 * | 6/2005 | Chen et al. | 700/119 |
| 2005/0208168 A1 * | 9/2005 | Hickerson et al. | 425/174.4 |

FOREIGN PATENT DOCUMENTS

| | | |
|---|---|---|
| TW | 200526386 A | 8/2005 |
| WO | WO 03002349 A2 | 1/2003 |
| WO | WO 2008/077850 A2 | 7/2008 |
| WO | WO 2008077850 A2 | 7/2008 |

OTHER PUBLICATIONS

First Office Action for Chinese Patent Application No. 201080038580.3.
International Search Report dated Oct. 19, 2010 from PCT/AU10/00946.

(Continued)

*Primary Examiner* — Michael D Masinick
*Assistant Examiner* — Anthony Whittington
(74) *Attorney, Agent, or Firm* — Eric L. Lane; Green Patent Law

(57) ABSTRACT

Disclosed herein is a device adapted to make a solid object. The device has a surface rotatable around an axis of rotation, and an applicator adapted to apply over at least one portion of the surface a material used to make the solid object. The applicator and the surface are displaceable relative to each other in a direction transverse to the axis. Disclosed herein are also methods of determining instructions for the device.

13 Claims, 13 Drawing Sheets

(56) References Cited

OTHER PUBLICATIONS

Cox, George J., "Pottery for Artists Craftsmen & Teachers," Jan. 1942, pp. 59-79, The MacMillan Company, New York, NY.

Second Office Action for Chinese Patent Application No. 201080038580.3 dated Jul. 11, 2014.

* cited by examiner

3D PRINTING ON A ROTATING CYLINDRICAL SURFACE

CROSS REFERENCE TO RELATED APPLICATIONS

This application is a National Stage Filing under 35 U.S.C. §371 of PCT International Application No. PCT/AU2010/000946, filed Jul. 29, 2010, claiming priority to Australian Application No. 2009903526, filed Jul. 29, 2009 and Australian Application No. 2009903574, filed Jul. 31, 2009, the entire contents of which are incorporated herein by reference.

FIELD OF THE INVENTION

The present invention generally relates to a device and method for building solid objects by layer-wise deposition of a material.

BACKGROUND OF THE INVENTION

A three dimensional—that is solid—object can be built up by depositing a material over a flat fabrication platform one layer at a time. Once a layer is deposited, then another layer is deposited in contact with the previous layer. Repetition of this process allows multi-laminate solid objects to be fabricated. This is the basis of techniques such as rapid prototyping.

The prior art method and systems are characterised by an x-y-z—that is a rectilinear Cartesian—coordinate system. Either the platform or the part that deposits the material onto the platform is typically scanned back and forth in a rectilinear fashion, requiring frequent changes in direction of the scanning part. The more rapid the changes in direction the faster the solid object can be completed. During the changes in movement material may not be applied.

SUMMARY OF INVENTION

A first aspect of the invention provides a device adapted to make a solid object comprising:
  a surface rotatable around an axis of rotation;
  an applicator adapted to apply over at least one portion of the surface a material used to make the solid object;
  the applicator and the surface being displaceable relative to each other in a direction transverse to the axis.

In the context of this specification, "a solid object" is tangible. A solid object may, for example, have a void or hollow in it, such as has a vase. The solid object may be rigid, but may alternatively or additionally be resilient, for example.

In an embodiment, the device comprises a controller configured to receive instructions for making the solid object. The controller may receive the instructions in the form of data indicative of a plurality of curved layers of material to be applied sequentially by the device. The layers may be individually determined. Each individually determined layer may differ from another of the layers by, for example, the shape of their respective boundaries. Not every layer needs to be different, however. The controller may be configured to coordinate rotation of the surface, displacement of the applicator relative to the surface, and the application of the material by the applicator, such that the plurality of layers of material are applied sequentially over the at least one portion of the surface in accordance with the received instructions. The controller may comprise a processor.

In an embodiment, the controller is configured to control the displacement of the applicator and the surface relative to each other after the application of one of the layers of material in the direction transverse to the axis of rotation by one or more steps, each step being equal to a predetermined length. The length may be, or may be commensurate with, the thickness of a layer of deposited material. Typically, the applicator may be set to a first predetermined position, the material is deposited, and then the applicator is set to a second predetermined position in preparation for the further deposition of the material.

Once the rotatable surface is set in motion there may be a reduced need, in comparison to equivalent prior art device characterized by an x-y-z coordinate system or flat fabrication platform, to change the velocity or direction of the movement of the rotatable surface or applicator. This reduction may be dramatic. Rapid changes in movement—that is high acceleration—typically requires relatively powerful and expensive motors. Avoiding high acceleration allows less powerful and cheaper motors to be used in embodiments of the present invention. Reducing acceleration reduces inertial forces and thus lessens the required device rigidity. A lighter and cheaper construction having bearings of reduced strength and cost, for example, may be used. Relatively more fragile solid objects may be fabricated because the inertial forces are reduced. Because some embodiments may reduce the periods in which changes in movement occur during which material may not be applied, these embodiments may take less time to construct the solid object. In some embodiments, the peak velocity of rotation may be relatively high, increasing the rate at which material can be deposited which may result in a period of time to complete the solid object that is less than the period of time to complete the solid object using an equivalent prior art device characterized by an x-y-z coordinate system or flat fabrication platform. Material may be deposited without the inertial considerations associated with rapid scanning of either a flat platform or the applicator. This may allow the applicator to continuously deposit material at close to its maximum rate.

In an embodiment, the device is further adapted to apply a substance adapted to support the material. The applicator may be adapted to apply the substance adapted to support the material. Alternatively, the device may comprise another applicator adapted to apply the substance. The substance may be applied over the at least one or another portion of the surface.

The material may be applied over a portion of the applied supporting substance. Thus, more complex objects having features that may not otherwise be produced (such as an overhang of material supported on its underside by the substance) can be produced. The substance and the material may be separated by taking advantage of their different properties. The different properties may be, for example, different solubility in a solute, different melting point etc.

In an embodiment, the device is configured to be orientated in use such that the material is ejected from the applicator in a direction having no substantial downward component. An angle made by the direction in which material is ejected from the applicator and the vertical may be in the range 75 degrees to 180 degrees. The device may be configured to be orientated in use such that the applicator ejects the material in substantially the same horizontal plane as the axis of rotation. Alternatively, the device may be configured to be orientated in use such that the applicator ejects the material upwardly.

The direction the material is ejected may be determined by the relative position of the applicator and axis. The device may be configured to be orientated in use such that the applicator is located anywhere from substantially in the same horizontal plane as the axis of rotation to substantially below the axis. The device may be configured to be orientated in use such that the applicator is located in substantially the same horizontal plane as the axis of rotation.

Having applicators orientated such that material is ejected without a substantial downward component, such as from the side, or below the axis, may result in any material (or substance) that has leaked from the applicator falling free of the surface. Leaking material (or substance) occurs all too frequently, and may ruin or at least result in a malformed solid object. Having the applicator in substantially the same level (or plane) as the axis may result in the leaked material falling free of both the applicator and the surface. The position of the applicator relative to the axis is not critical and is susceptible to variations provided the leaked material falls free of the surface and/or applicator. For example, an applicator slightly above the level of the axis may still satisfy the fore mentioned condition(s). Applicators configured to eject material without a substantial downward component may be of a relatively simple construction and may exhibit passive stability, such as, they do not leak in the event of a power failure.

In an embodiment, the device is configured such that the surface rotates in a single direction during the formation of at least a significant fraction of the solid object. For example, a significant fraction of the solid object may be, in some circumstances, at least one layer of the solid object. The surface may rotate in a single direction during the formation of the solid object.

Embodiments in which the surface rotates in a single direction may eliminate the effects of backlash, that is, positioning errors in mechanical devices typically introduced when they change direction. Thus, good positioning precision can be achieved without special backlash compensating equipment. Rotating in a single direction may also reduce sensitivity to positioning errors in the x-axis between the applicator and the surface, which can result in material placement errors due to variation in the time taken for ejected material to travel from the applicator to the previously deposited layer when the surface is moving. Thus, greater tolerance to mechanical positioning errors may be achieved. It will be understood, however, that a relatively small number of changes in rotation may be tolerable in certain circumstances. The direction of rotation may be changed after the deposition of one layer. By way of contrast, in prior art devices characterised by a rectilinear coordinate system, there are many changes in direction per applied layer.

In an embodiment, the device is configured such that the surface continuously rotates during formation of a significant fraction of the solid object. For example, a significant fraction of the solid object may be, in some circumstances, at least one layer of the solid object. The device may be configured such that the surface continuously rotates during formation of the solid object Embodiments in which the surface continuously rotates may facilitate faster average material application rates because there is no pause during the time that the surface does not rotate with sufficient (or any) velocity during which material application must be stopped. It will be appreciated, however, that a relatively small number of changes in the direction of rotation may be tolerated in some circumstances. The rotation may be stopped or changed direction after the deposition of one layer. By way of contrast, in prior art devices characterised by a rectilinear coordinate system, there are many changes in direction per applied layer reducing the rate at which the solid object is made.

In an embodiment, the surface is curved. The surface may comprise at least in part an arcuate surface disposed adjacent the axis. Alternatively, the device comprises a cylinder centred on the axis of rotation and rotatable around the axis, the surface being a surface of the cylinder. The surface may be an outward facing surface of the cylinder. Alternatively, the surface may be an inward facing surface of the cylinder. The cylinder may be a circular cylinder.

Having a curved surface may maintain a constant distance between the applicator and the surface while the surface is rotating, which may simplify the control and optimisation of the application process.

Embodiments having a cylinder may maximise the area on which the object may be formed, which in turn maximises the allowable size of the solid object and/or number of objects formed on the device.

The layers are each typically curved in accordance with the surface over which they have been applied, or an immediate previously applied layer.

In an embodiment, the applicator and the surface are displaceable relative to each other in a direction parallel with the axis.

Material may be applied over the surface during the relative displacement in a direction parallel with the axis, to cover a substantial area, even if the applicator can only address a small portion of the surface when not displaced.

In an embodiment, the device comprises a servo motion control system configured to control rotation of the surface around the axis.

In an embodiment, the device comprises an encoder for determining the rotational orientation of the cylindrical platform.

A servo motion control system and/or an encoder may provide accurate positioning of the material on the surface during rotation, and increased resolution of the application process. Alternatively, a stepper motor may be used to rotate the surface.

In an embodiment, the device comprises a shaper arranged to shape the applied material. A shaper, for example a levelling device, may be employed to ensure that the thickness of an applied layer of material is constrained to a prescribed thickness.

In an embodiment, the applicator is adapted to apply a particular material. The material may comprise a fluid that hardens on being illuminated by a light—that is, a photo-curable fluid. The material may comprise a phase change material. The material may be a combination of the photo-curable fluid and the phase change material.

In an embodiment, the applicator may comprise a drop-on-demand print-head.

In an embodiment, the surface is compatible with the material. Alternatively or additionally, the surface may be compatible with the substance.

In an embodiment, the device comprises a light source illuminating at least some of the surface, the light having characteristics suitable for the curing of a photo-curable fluid.

A second aspect of the invention provides a method of determining instructions for a device adapted to make a solid object in accordance with the first aspect of the invention, the method comprising the steps of:

receiving information representing the solid object; and
decomposing the information into data indicative of a plurality of curved layers of material to be applied sequentially by the device, the material being used to make the solid object.

A file having been generated by a computer aided design package—such as AutoCAD, Solidworks or NX—and having information representing the solid object may be supplied and this may be converted into a form suitable for instructing the device. The supplied information may not be (and is typically not), suitable for instructing the device.

In an embodiment, each of the layers may be individually determined. Each layer may be different.

In an embodiment, the data comprises a plurality of data units. The plurality of data units may be arranged as a plurality of sets of data units, each set corresponding to one of the plurality of layers. Each of the plurality of sets may be arranged as an array.

In this context, array has a broad meaning. An array need not be defined using a programming language's predetermined array data type but may be a custom data type having a similar structure.

In an embodiment, the data units each comprise a data bit.

In an embodiment, each data unit is indicative of an instruction to the device to apply or not apply material. Each data unit may also be indicative of an instruction to the device to apply or not apply substance.

In an embodiment, the step of receiving information comprises the step of receiving information representing a solid object as a plurality of elements. The elements may be triangles or planar sections, for example.

In an embodiment, the step of decomposing the information may comprise the step of determining the intersection(s) of an imaginary cylindrical surface with one or more of the elements. A boundary defining an area in which material is to be applied may be determined using the intersection(s).

In an embodiment, the elements may each comprise a triangle. The triangles may be arranged in a mesh. The step of decomposing the information into a plurality of data units may comprise the step of determining a radius of an imaginary cylindrical surface corresponding to a layer of material to be applied, and a position of a central axis of the imaginary cylindrical surface relative to the representation of the solid object. The method may comprise the step of calculating the intersection point(s) of the imaginary cylindrical surface with one or more edges of at least one of the triangles. The step of calculating the intersection point(s) with one or more edges of at least one of the triangles may comprise the step of selecting a first triangle. The intersection points of the surface with another edge of the first triangle may be determined. The edge of a triangle adjacent to the first triangle may be determined. The intersection point of the cylindrical surface with one or more edges of the adjacent triangle may be determined. A boundary defining an area in which material is to be applied may be determined using the intersection points. The area may define one of the layers. The area may be mapped to the plurality of data units.

In an alternative embodiment, the step of receiving information comprises the step of receiving information representing a solid object as a plurality of sections through the object. The sections may be planar. The sections may be regularly spaced apart. The sections may be parallel. The sections may each comprise a boundary, each boundary enclosing a respective section area. The step of decomposing the information into a plurality of data units may comprise the step of determining a radius of an imaginary cylindrical surface corresponding to a layer of material to be applied, and a position of a central axis of the imaginary cylindrical surface relative to the representation of the solid object. The step of decomposing the information may comprise the step of determining the intersection(s) of the cylindrical surface with a first plane in which a first one of the sections is located, a first area being located between the intersections. Further intersections of the cylindrical surface with a second plane in which a second section is located may be determined, a second area being located between the further intersections. The first section may be adjacent to the second section. The step of decomposing the information may comprise the step of subtracting one of the first and second areas from the other to form a third area, and projecting the third area onto the imaginary cylinder. The third area may define one of the layers. The third area projected onto the imaginary cylinder may be mapped to the plurality of data units.

A third aspect of the invention provides a method of determining instructions for a device adapted to make a solid object, the method comprising the steps of:
  receiving information representing the solid object;
  determining the intersections of a plurality of imaginary cylindrical surfaces with the representation, each of the cylindrical surfaces having a different radius;
  for each of the plurality of imaginary cylindrical surfaces, determining a boundary of an area using the intersections, the area corresponding to a curved layer of material to be applied by the device, the material being used to make the solid object.

In an embodiment, the method comprises, for each of the plurality of imaginary cylindrical surfaces, mapping the area so determined to a plurality of data units, each data unit being indicative of an instruction to the device to apply or not apply the material at a respective point.

In an embodiment, the plurality of data units belongs to one of a plurality of sets of data units, and each set of data units corresponds to a respective curved layer of material.

In an embodiment, each set of units constitutes, at least in part, an array of units.

In an embodiment, the step of receiving information comprises the step of receiving information representing a solid object as a plurality of elements. The elements may be triangles or planar sections, for example.

In an embodiment, the step of decomposing the information may comprise the step of determining the intersection(s) of an imaginary cylindrical surface with one or more of the elements. A boundary defining an area in which material is to be applied may be determined using the intersection(s).

In an embodiment, the elements may each comprise a triangle. The triangles may be arranged in a mesh. The step of decomposing the information into a plurality of data units may comprise the step of determining a radius of an imaginary cylindrical surface corresponding to a layer of material to be applied, and a position of a central axis of the imaginary cylindrical surface relative to the representation of the solid object. The method may comprise the step of calculating the intersection point(s) of the imaginary cylindrical surface with one or more edges of at least one of the triangles. The step of calculating the intersection point(s) with one or more edges of at least one of the triangles may comprise the step of selecting a first triangle. The intersection points of the surface with another edge of the first triangle may be determined. The edge of a triangle adjacent to the first triangle may be determined. The intersection point of the cylindrical surface with one or more edges of the adjacent triangle may be determined. A boundary defining an area in which material is to be applied may be determined using the intersection points. The area may define one of the layers. The area may be mapped to the plurality data units.

In an alternative embodiment, the step of receiving information comprises the step of receiving information representing a solid object as a plurality of sections through the object. The sections may be planar. The sections may be regularly spaced apart. The sections may be parallel. The sections may each comprise a boundary, each boundary enclosing a respective section area, The step of decomposing the information into a plurality of data units may comprise the step of determining a radius of an imaginary cylindrical surface corresponding to a layer of material to be applied, and a position of a central axis of the imaginary cylindrical surface relative to the representation of the solid object. The step of decomposing the information may comprise the step of determining the intersection(s) of the cylindrical surface with a first plane in which a first one of the sections is located, a first area being located between the intersections. Further intersections of the cylindrical surface with a second plane in which a second section is located may be determined, a second area being located between the further intersections. The first section may be adjacent to the second section. The step of decomposing the information may comprise the step of subtracting one of the first and second areas from the other to form a third area, and projecting the third area onto the imaginary cylinder. The area may define one of the layers. The third area projected onto the imaginary cylinder may be mapped to the plurality of data units.

Embodiments of the second and third aspects of the invention may be performed in a processor.

A fourth aspect of the invention provides a processor for determining instructions for a device adapted to make a solid object, the processor comprising
 a receiver adapted to receive information representing the solid object; and
 a decomposer adapted to decompose the information into a plurality of data units, the plurality of data units being indicative of a plurality of curved layers of material to be applied one layer at a time by the device and from which the solid object is formed.

In an embodiment, each of the plurality of layers are individually determined.

In an embodiment, the decomposer comprises a radius and position determiner adapted to determine a radius of an imaginary cylindrical surface corresponding to a layer of material to be applied, and a position of a central axis of the imaginary cylindrical surface relative to the representation of the solid object.

In an embodiment, the decomposer comprises an intersection determiner adapted to calculate one or more intersections of the cylindrical surface with elements constituting, at least in part, the representation of the solid object. The elements may be triangles or planar sections, for example.

In an embodiment, the decomposer comprises an area generator adapted to determine an area using the intersections, the area corresponding to an area in which material is to be applied.

In an embodiment, the decomposer comprises a mapper adapted to map the area to the plurality of data units.

A fifth aspect of the invention provides a processor for determining instructions for a device adapted to make a solid object, the processor comprising:
 a receiver adapted to receive information representing the solid object;
 an intersection determiner adapted to determine the intersections of a plurality of imaginary cylindrical surfaces with the representation, each of the cylindrical surfaces having a different radius;
 an area generator adapted to, for each of the plurality of imaginary cylindrical surfaces, determine a boundary of an area using the intersections, the area corresponding to a curved layer of material to be applied by the device, the material being used to make the solid object.

A sixth aspect of the invention provides a method of fabricating a solid object, the method comprising the steps of:
 providing a device adapted to make a solid object according to the first aspect of the invention;
 determining instructions for the device by the method according to either one of the second and third aspects of the invention; and
 providing the instructions to the device.

A seventh aspect of the invention provides processor readable tangible media including program instructions which when executed by a processor cause the processor to perform the method of either one of the second and third aspects of the invention.

An eighth aspect of the invention provides a computer program for instructing a processor, which when executed by the processor causes the processor to perform the method of either one of the second and third aspects of the invention.

DESCRIPTION OF THE FIGURES

In order to achieve a better understanding of the nature of the present invention, embodiments will now be described, by way of example only, with reference to the accompanying figures in which.

DETAILED DESCRIPTION OF EMBODIMENTS OF THE INVENTION

Figure 1:
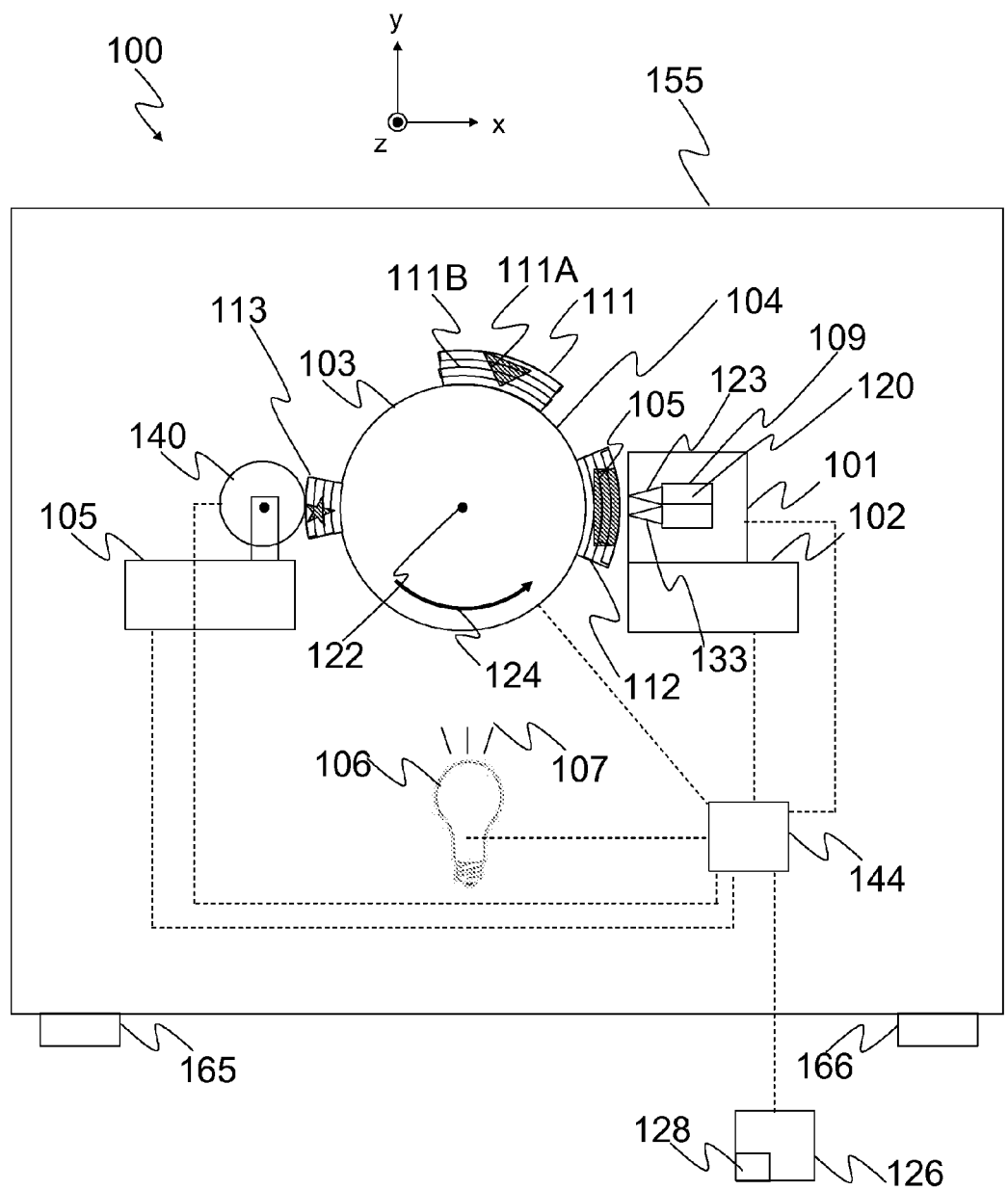
FIG. 1: shows a schematic side view of an embodiment of a device for making a solid object in accordance to one aspect of the present invention.

Referring to FIG. 1, an embodiment of a device 100 for making a solid object 105, according to one aspect of the present invention, is shown. The force of gravity is in the negative y-direction. The device 100 comprises an applicator 101 adapted to apply over at least one portion of a surface 104 a material 120 used to make the solid object 105. The material may be described as object material.

The applicator 101 and the surface 104 are displaceable relative to each other between predetermined positions. That is, their separation may be altered. In this, but not in all embodiments, it is the applicator 101 that is displaced, not the surface 104. The predetermined positions may be separated by a distance commensurate with the thickness of a layer of deposited material. Typically, the applicator is set to a first predetermined distance from the surface, the material is applied, and then the applicator is set to a second predetermined distance from the surface in preparation for the further application of the material. At each predetermined position a layer of material is applied. Each layer is determined independently, and thus may be different from another layer, so that a solid object of arbitrary shape may be fabricated. There are 100-1,000,000 predetermined applicator positions in a typical device, but the number may fall outside of this range. The minimum separation between predetermined positions may be determined by the characteristics of the motor causing the displacement. In the case of a stepping motor, for example, the separation between adjacent positions may be a multiple of the minimum step size that the motor is capable of. The separation may be set by software, or a combination of software and hardware factors. The separation of the first and second predetermined positions is typically equal to the thickness of a layer of the deposited material. The layer thickness may be in the range of 1 micron to 5 mm for example, but is typically around 0.01 to 0.1 mm for an object of the order of 10 cm.

The material 120 may be stored in a liquid phase in a material reservoir 109 in communication with the applicator 101. In this, but not necessarily all, embodiments the reservoir is integral with the applicator. In other embodiments, the reservoir is separate from the applicator and may be connected by a conduit such as a hose in which the material flows. Such hoses may be prone to snagging and/or failure, however.

The surface 104 is rotatable around an axis of rotation 122. The direction of rotation is predominantly that indicated by the arrow 124, or in alternative embodiments, predominantly in the opposite direction. In this embodiment, the applicator has one or more nozzles 123 for ejecting material over the surface 104. The applicator may be positioned by a translation stage 102 that it is mounted on. The applicator is elongated in the direction of the axis and is mounted in a direction substantially parallel with the axis 122 so that the applicator can address multiple points along the surface. In at least one embodiment, the surface, not the applicator, is translated.

Figure 2:
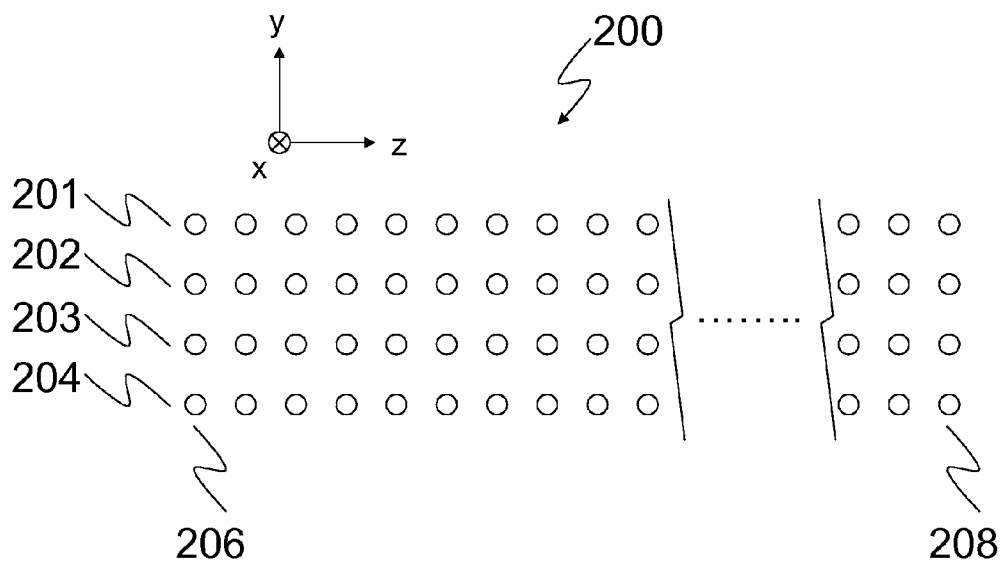
FIG. 2: shows a schematic diagram representing nozzles of an applicator of the device of FIG. 1.

In other embodiments the applicator has an array of nozzles extending parallel with the axis, as shown in FIG. 2, and can address all required points on the rotatable surface by being translated only the width of the nozzle spacing, or if the spacing is sufficiently small, without being translated at all. The applicator, in one embodiment, has a piezoelectric print-head with multiple nozzles and multiple fluid channels. Translation stage 102 is capable of moving the applicator 101 in both the x and z-directions according to the coordinate system shown in FIG. 1, and so the applicator and the surface are displaceable relative to each other in a direction transverse to the axis. In alternative embodiments, the surface is alternatively or additionally translated.

Figure 16:
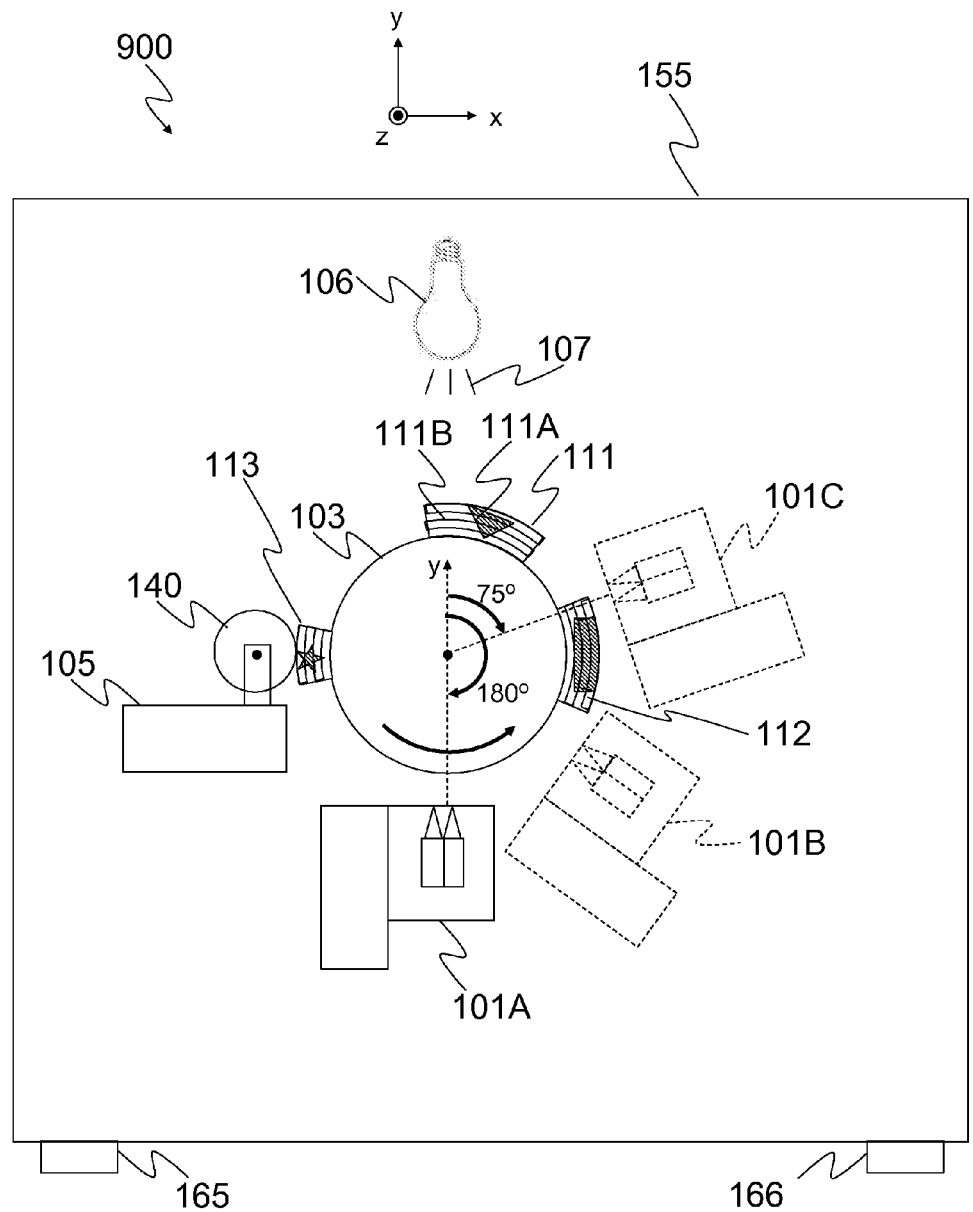
FIG. 16: shows a schematic side view of another embodiment of a device for making a solid object in accordance with one aspect of the invention.

The device 100 is configured, in the illustrated but not necessarily in all embodiments, such that in use the applicator 101 and the axis 122 are located approximately in the same horizontal plane (possibly just above or bellow the plane) and the material is ejected from the applicator in a substantially horizontal direction. The device may have, for example, a chassis 155 with attached feet 165,166, or mounting points, for supporting the device above a bench top, other surface or structure, for example. The relative positioning and orientation of the feet (or mounting points), chassis and components define the orientation of the device, and thus the components, in use. In some alternative embodiments, the applicator may be located below the level of the axis 122 and the material may be ejected upwardly, as shown in device 900 of FIG. 16 in which components like those in FIG. 1 are similarly numbered. The applicator may be located next to or below the axis, or an intermediate position. Various possible positions and orientations of the applicator are shown in dashed line, and this particular embodiment has the applicator directly below the axis. In the embodiments shown in FIGS. 1 and 16, the material is ejected in a direction having no substantial downward component. The angle made by the applicator and the vertical may be from 75 degrees to 180 degrees, for example.

Figure 17:
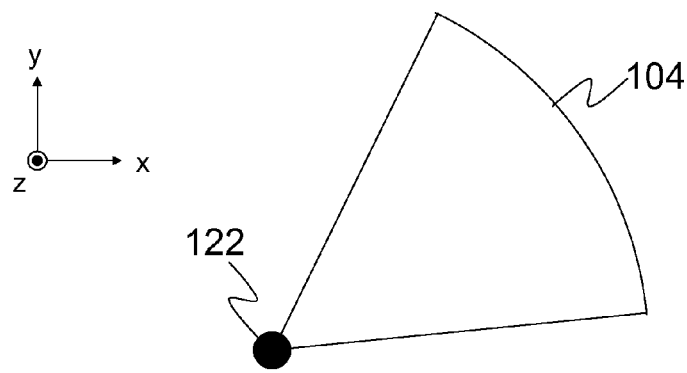
FIG. 17: shows a schematic diagram of an example of an arcuate surface over which a material from which the solid object is formed may be applied.
Figure 18:
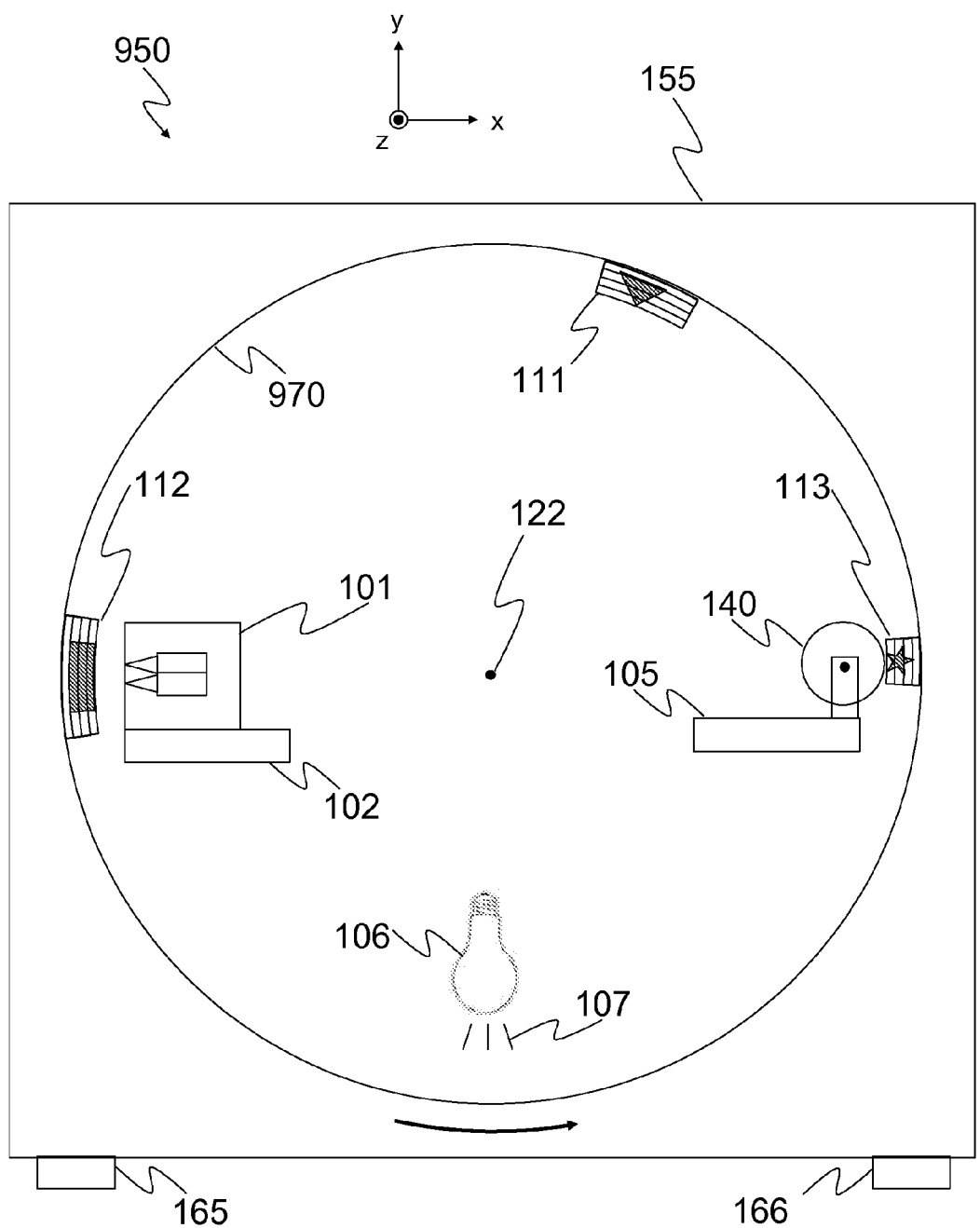
FIG. 18: shows a schematic side view of another embodiment of a device for making a solid object in accordance with one aspect of the invention in which material is deposited on an inner circumferential surface of a cylinder.

In this embodiment, the surface 104 is the outward facing surface of a circular cylinder 103. The surface need not extend all the way around the axis 122 to form a cylinder—the surface 104 may be arcuate, as shown in FIG. 17, in which similar parts are similarly numbered. An alternative embodiment of the invention 950 shown in FIG. 18 may have an applicator disposed within a cylinder and the applicator is configured to deposit material on an inner circumferential surface 970 of the cylinder. In FIG. 18 components like those in FIG. 1 are similarly numbered. The applicator can be translated within the cylinder. This configuration may have the advantage that an inertial force on the solid object being formed is into the surface and thus the object being formed is less likely to inadvertently separate from the surface during its formation. It will be appreciated that many of the features described with respect to the embodiment shown in FIG. 1 may be used with respect to the embodiment shown in FIG. 18. Generally, any appropriately curved surface may suffice.

In an alternative embodiment, the cylinder may have an outer sleeve, in the form of either one of a rigid or flexible tube, for example. In this case, the sleeve may be removed, after material application is complete, together with the solid object. The cylindrical platform 103 presenting surface (or sleeve) 104 may be constructed from a material that the deposited material and any other deposited substance adheres to, such as aluminium.

Figure 3:
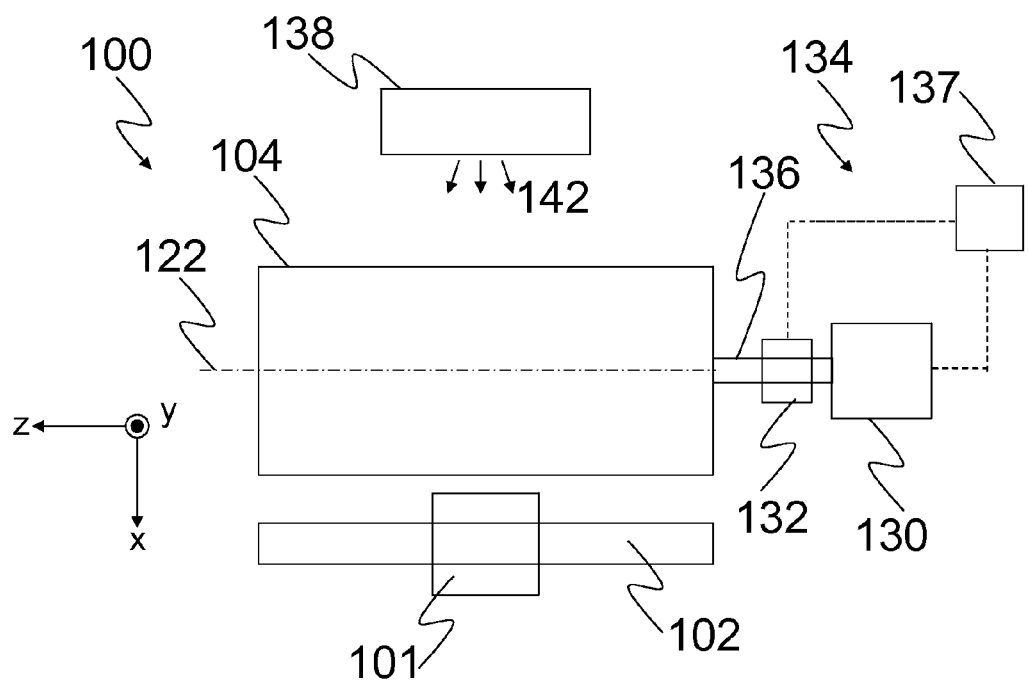
FIG. 3: shows a schematic plan view of the device shown in FIG. 1.

As shown in FIG. 3, but not necessarily in all embodiments, the surface 104 can be rotated to known positions around its axis by a motor 130 driving an interconnecting drive axle 136 using information from a position encoder 132 operationally coupled to the surface 104. Alternatively, a servo motion control system 134 comprising a control unit 137 in communication with the encoder and motor may be used.

Excess material deposited by the print-head 101 onto the cylindrical platform 103 can be removed with a shaper, such as a levelling device 140. Levelling device 140 may comprise a cylindrical milling blade which rotates around an axis substantially parallel to the axis 122 of the cylindrical platform 103. The levelling device may rotate at high speed and be located in an extraction enclosure to evacuate removed material. The levelling device 140 may alternatively be a heated cylindrical roller which rotates around an axis substantially parallel to the axis 122 of the cylindrical platform 103. Melted material which adheres to the surface of the heated roller is subsequently removed from it with a scraping blade. The purpose of levelling each deposited layer is to ensure that the deposited layer has the prescribed thickness, otherwise subsequent layers may not be deposited in their correct radial position from the axis of the cylindrical platform 103 resulting in a fabricated object that does not match the desired shape and/or tolerances. The levelling device 140 is mounted on a translation stage 105 which is capable of movement substantially in the x-axis according to the coordinate system shown in FIG. 1.

The material is typically ejected from the print head in liquid form and later becomes solid. The material applied by the applicator 101 may, for example, be a wax, a thermoplastic or curable polymer such as an acrylate or an epoxy based photopolymer. Applied materials are typically either thermal phase-change materials such as thermoplastics and waxes, or photopolymer resins that can be hardened by exposure to suitable electromagnetic radiation such as ultraviolet light. In some embodiments, the material is provided to the applicator by a material feeder not shown in the Figures. When a photopolymer material is used a light source 106 can be controlled to emit light 107, such as an ultraviolet or blue light, to harden the applied material. Where the deposited material is a wax or thermoplastic it will harden by freezing provided that the ambient temperature is lower than the softening-temperature of the wax. This process may be enhanced with a cooling fan 138 directing air 142 at the cylinder 103. Not all embodiments eject material in a purely liquid form. In an embodiment, the material ejected from the print head may contain suspended solids, such as a colloid, for example.

The applicator 101 (or one or more additional applicators in some other embodiments) may also deposit a substance as well as the material. The applicator has one or more nozzles 133 for ejecting the substance over the surface. The substance may be stored in a liquid phase in a corresponding substance reservoir in communication with the applicator. In this, but not necessarily all embodiments, the reservoir is integral with the applicator. In other embodiments the reservoir is separate from the applicator and may be connected by a conduit such as a hose in which the substance flows. In the illustrated embodiment the substance nozzle is located below the material nozzle 123 but in other embodiments, for example, they may be located in the same horizontal plane, that is, the same y-position. The function of the substance is to provide support for the material forming the solid object during fabrication so that features that could not otherwise be fabricated, for example overhangs, can be fabricated. The substance may be described as a support substance. The substance and the material in one embodiment are waxes. The substance may have a lower melting point than the material and thus elevating the temperature of the deposited material and substance intermediate their melting points results in the substance melting, leaving the solid object intact. Alternatively, the waxes may have, for example, different solubility in a solvent such as ethanol, which can be exploited to separate the substance from the material. Suitable substance and material chemicals for this process are available from Jet-Wax Laboratories Corporation.

Figure 4:
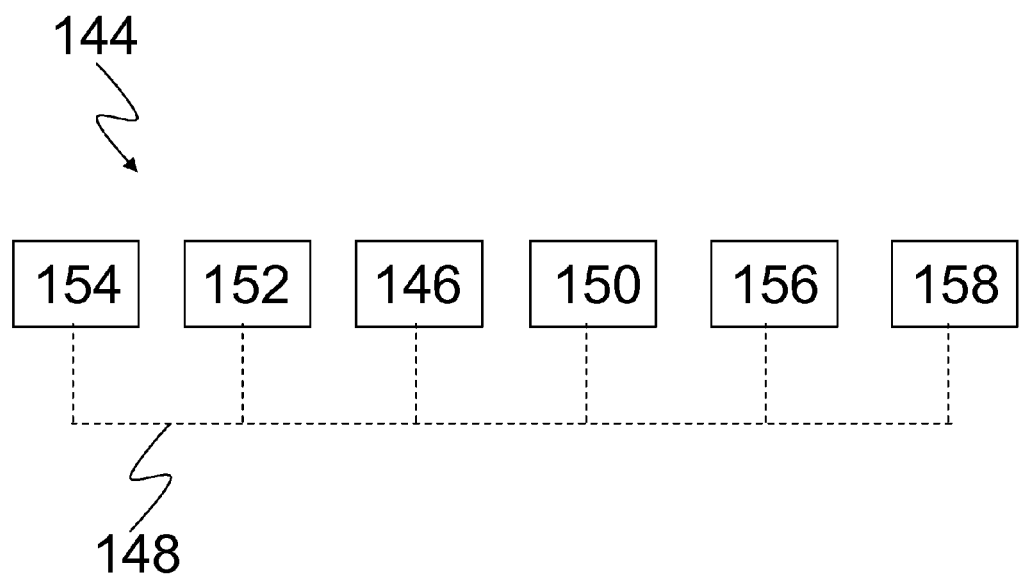
FIG. 4: shows an embodiment of a controller for controlling the device shown in FIG. 1.

The applicator 101, applicator translation stage 102, servo motion control system 137, levelling device 140, levelling device translation stage 105 and light source 106, for example, may be in communication with and may be controlled by a controller 144 to coordinate the material and substance application process. In this embodiment, the controller may have a processor unit, schematically illustrated in FIG. 4, including a suitable micro processor 146 such as, or similar to, the INTEL PENTIUM, connected over a bus 148 to a random access memory 150 of around 100 Mb and a non-volatile memory such as a hard disk drive 152 or solid state non-volatile memory having a capacity of around 1 Gb. The processor has input/output interfaces 154 such as a universal serial bus and a possible human machine interface 156 e.g. mouse, keyboard, display etc. The applicator 101, translation stage 102, cylindrical fabrication platform 103, light 106, and possibly other components may be controlled using commercially available machine-to-machine interfaces such as LABVIEW software together with associated hardware recommended by the commercial interface provider installed on the processor unit 144, over USB or RS-232 or TCP/IP links, for example. Alternatively, custom driver software may be written for improved performance together with custom printed circuit boards.

In this embodiment, the controller 144 is in communication with a processor 126 which is adapted for determining instructions and/or information for the device 100. In alternative embodiments, the processors 144,126 are the same processor. An example of a suitable processing unit comprises a micro processor such as, or similar to, the INTEL PENTIUM, connected over a bus to a random access memory of around 100 Mb and a non-volatile memory of such as a hard disk drive or solid state non-volatile memory having a capacity of around 1 Gb. Generally, the configuration may be similar or identical to that shown in FIG. 4. The processor 126 has a receiver 128 such as a USB port (or Internet connection, for example) for receiving information representing a solid object, stored on a USB FLASH device, for example. The information may be encoded in a file generated by a Computer Aided Design (CAD) program, the information specifying the geometry of the object. The microprocessor runs a decomposer program implementing an algorithm that decomposes (or transforms) the information into data indicative of a plurality of curved layers of material to be applied sequentially by the device 100, the material being used to make the solid object. The curved layer, expressed in cylindrical coordinates, is highly complementary to the cylindrical surface. The program may have been installed onto the processor from tangible media such as a DVD or USB memory stick, for example, that stored the program. In an alternative embodiment, the decomposer may be a dedicated hardware unit. A series of cylindrical sections through the object are determined, each section corresponding to a layer to be applied. The cylindrical cross-sections are then further processed to represent the geometry of each cylindrical cross-section as a rasterized bitmap. Regions of the bitmap which represent the object are identified, and further regions of the bitmap which represent a supporting structure for overhanging features of the object are calculated and identified. Furthermore, if the object is to be fabricated from multiple materials or colours, the bitmap representation of the object is further processed to identify which materials need to be present at each location. The number of pixels in adjacent bitmaps may vary, as cylindrical cross-sections at greater radial distances will have greater circumference and thus greater surface area whereas the applied droplets of material and substance will be of a relatively fixed size.

The one or more bit maps are then used to control the application of the material and/or substance by the applicator 101.

In one embodiment the emitting face of the applicator comprises an array of nozzles 200 shown in FIG. 2 regularly spaced in the z-direction extending approximately the length of the cylindrical platform 103. In an embodiment 201, 202, 203 and 204 may each be a channel for respective materials (or substances) allowing multiple materials to be discharged by the nozzles. In one embodiment, one or more columns of nozzles (e.g. left-most column 206) may be material nozzles and one or more columns of nozzles may be substance nozzles (e.g. right-most columns 208). Multiple materials may be employed, for example, having different colour or different physical properties, such as hardness, and blended together upon application to create objects having unified or intermediate properties between the deposited raw materials.

In an embodiment, the applicator 101 applies material onto the cylindrical platform 103, which rotates about its own axis with the aid of the motor 130. It is possible to deposit material around the entire circumference of the cylindrical platform 103. An encoder provides feedback of the rotational orientation of the cylindrical platform 103 to the central processor unit 144. This information is used to ensure that the applicator deposits material droplets at the correct location on the cylindrical platform 103. After one full rotation of the cylindrical platform 103 about the axis, the applicator 101 is translated along the z-axis by one droplet width or less by translation stage 102. Further material is then deposited onto the cylindrical platform 103 as it completes a further revolution in the same direction of rotation without stopping. This process continues until the applicator has traversed the full pitch between the nozzles along the z-axis. In this manner a representation of the rasterized cylindrical cross-section of the object is deposited onto the cylindrical platform 103 in the required material at a resolution that may exceed the native resolution of nozzle spacing on the print-head. After the layer has been deposited, translation stage 102 moves the applicator 101 to its original position along the z-axis. The applicator may deposit material during movement in either direction along the z-axis. It is understood that due to the periodic spacing of nozzles of some applicators, the starting position of the applicator in the z-axis may be varied by a multiple of the pitch spacing between nozzles in some situations. This may average-out the effects of variation in droplet size deposited by different nozzles.

After a levelling of the solidified material has been completed the translation stage 105 may retract the levelling device 104 so that it is no longer in contact with the deposited layer.

After the deposited layer has been levelled, if the deposited material is a photopolymer it may be cured by switching on light source 106.

Subsequent layers of the object can be data processed, deposited by the applicator 101 onto the previously deposited layer on the cylindrical platform 103, hardened and levelled using the process just described. Depositing all layers of the object in this way results in a multilaminate structure in which the material, as depicted in FIG. 1 as 111A, is encased in substance 111B.

Multiple objects generally indicated by 111, 112 and 113 can be fabricated in parallel on the cylindrical platform 103. As, at least in this example, the entire cylindrical platform is addressed by the applicator 101 during the deposition of each layer, all objects build at the same rate in the radial direction. Therefore, multiple objects can be fabricated in parallel without increasing the fabrication time which corresponds to the time required to build the tallest object as measured by the radial distance from the axis of the cylindrical platform 103.

One significant advantage of some embodiments is that the direction of movement of the cylindrical build platform does not need to be changed during the build process. In other embodiments the cylindrical platform may rotate continuously in the same direction throughout the fabrication process. An applicator may eject approximately 20 micron diameter droplets of material at rates of approximately 33 kHz, enabling linear print speeds of approximately 700 mm/s. At this rate, using the present invention, material could be deposited at vertical build rates of around 14 mm per hour, which is approximately 5 times faster than the prior art devices which may achieve build rates of approximately 2 to 3 mm per hour at a similar resolution. By contrast, devices that deposit materials in a rectilinear coordinate system on a flat surface require the object being fabricated to be moved back and forth in front of the applicator (or vice versa) resulting in dead-time during the acceleration and deceleration phases. Furthermore, acceleration of the fabrication platform needs to be limited to prevent the object being fabricated from being damaged by inertia or coming free from the build platform. Further still, the mechanics for changing the velocity of the build platform rapidly need to be sturdy and thereby expensive. Yet further, changing direction introduces backlash into the mechanics which must be overcome. Thus, at least some embodiments of the present invention may ameliorate these problems, as the cylindrical platform can be powered with a motor of modest power, the mechanism rotates in the one direction so is inherently backlash free, and there is reduced dead-time during which material may not be deposited. Therefore the present invention may build parts faster whilst also requiring simpler and cheaper hardware.

It will be appreciated that many of the advantageous are retained even if continuous rotation of the cylinder 103 in a single direction is only during fabrication of a significant fraction of the solid object, for example during application of one layer or more of the solid object.

Figure 5:
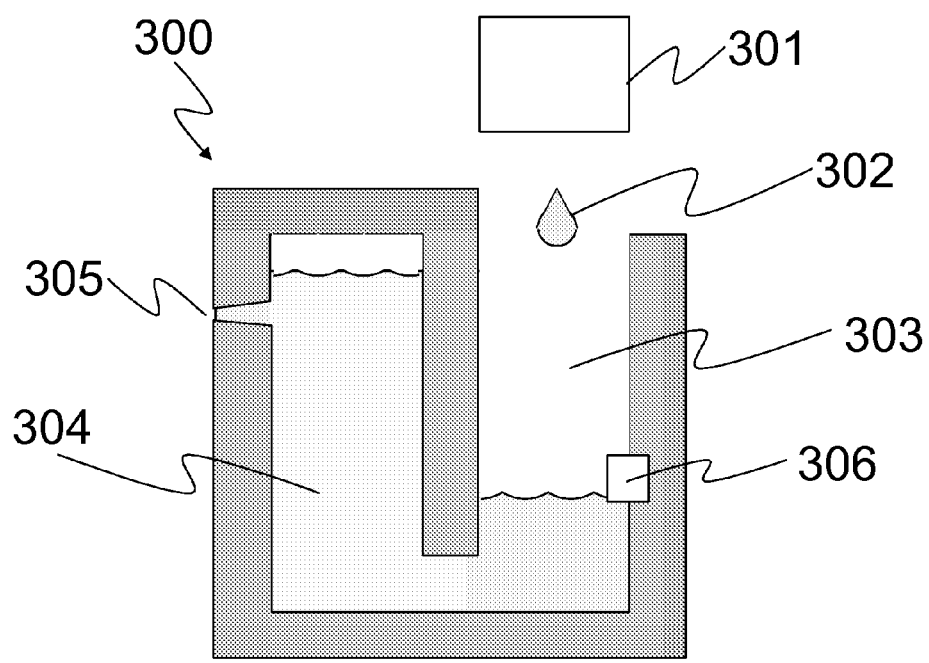
FIG. 5: shows a schematic diagram of an example horizontal-firing applicator in cross-section.

A second advantage of some embodiments is that the use of a cylindrical fabrication platform readily permits the use of nominally horizontal firing print-heads as the applicator, as opposed to downward firing print-heads employed in the prior art. FIG. 5 depicts a horizontal firing print-head configuration 300, showing a feed source 301 which drips material 302 into a feed reservoir 303 that is connected to a chamber 304 that subsequently feeds material to at least one nozzle 305. The feed rate of material is controlled by an electronic control loop so that the height of fluid in the feed reservoir is lower than the ejector nozzles. This control loop is aided by fluid level sensor 306. This creates a negative head of pressure at the nozzles due to the siphon effect, thereby preventing material from leaking out of the nozzles and maintaining the appropriate fluid meniscus required for the proper operation of the print-head. This horizontal firing configuration has the advantage of stability—it does not require active control when in a passive state (that is, not operating). It fails safe on power failures, and does not require any special precautions when powering down to prevent leakage. The print head may be rotated from the orientation shown and with minor mechanical adjustments so that the material is ejected upwardly.

Figure 6:
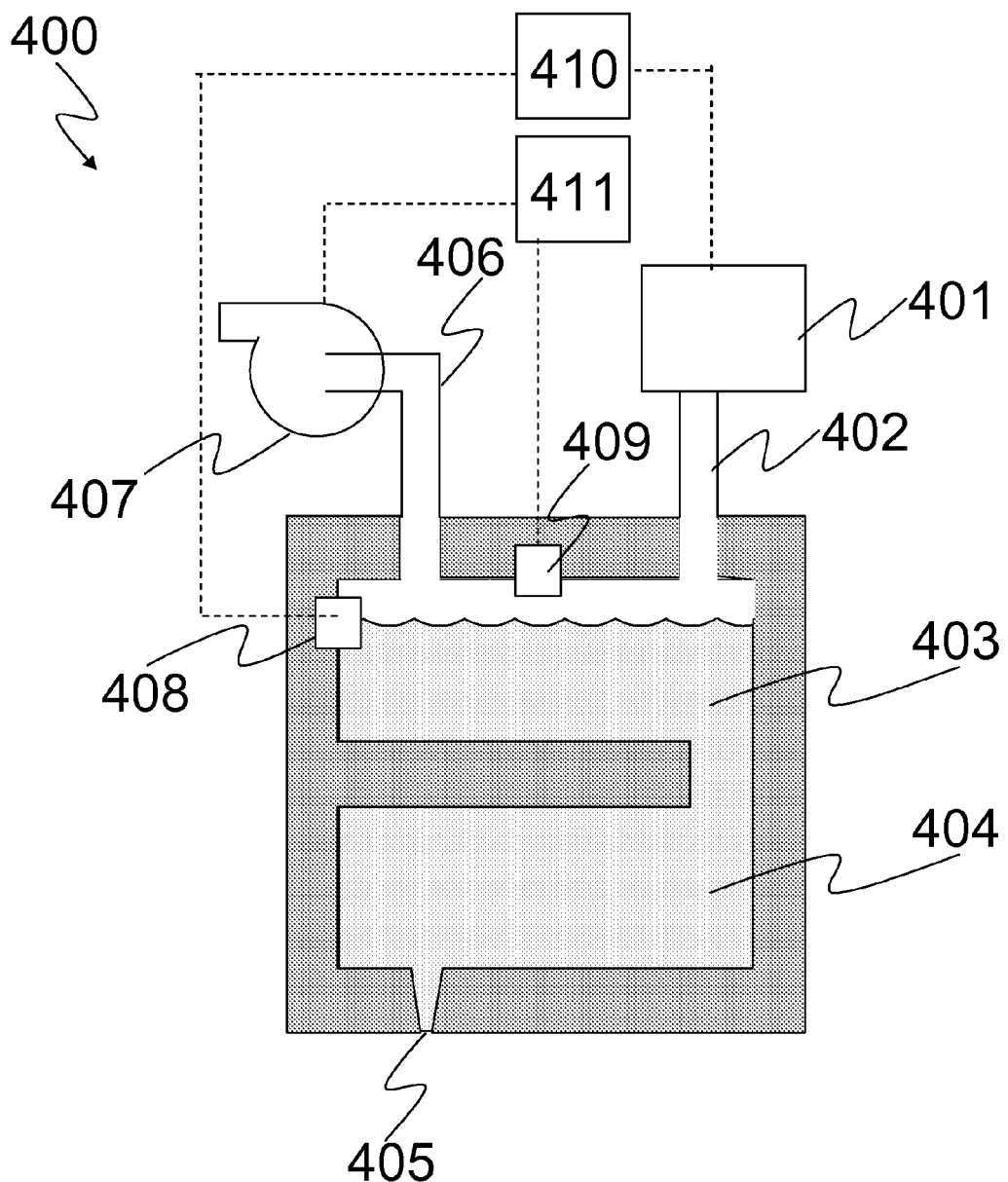
FIG. 6: shows a schematic diagram of an example downward-firing applicator in cross-section.

By comparison, FIG. 6 depicts a downward firing print head assembly 400, showing a feed source 401 with an airtight connection 402 to a feed reservoir 403 connected to a chamber 404 that feeds material to nozzles 405. In order to prevent material leaking from the nozzles due to the hydrostatic pressure of the fluid above it, a vacuum is drawn at a port 406 by a vacuum pump 407 to reduce the pressure at the nozzle 405 to below atmospheric pressure. Material level sensor 408 provides feedback to a processing unit 410 in communication with the feed source 401 to ensure a constant fluid level is maintained in the reservoir 403. Pressure sensor 409 provides a feedback signal to a controller 410 in communication with the vacuum pump 407 to control the vacuum in the feed reservoir at the required pressure. It can be seen that this downward firing print-head apparatus requires air-tight sealing of its feed and evacuation ports, and active control of fluid level and chamber pressure, adding to the complexity of the device. Furthermore, a momentary loss of vacuum in a downward facing print-head may result in material leakage from the print-head onto the object under fabrication, which can ruin the object. The inherent instability under vacuum failure or power-down impacts the reliability of the system for fabricating solid objects.

It may be possible to construct a passive negative pressure maintaining system for a downward firing print head whereby a fluid reservoir is maintained below the level of the ejection nozzles. In this case the reservoir would need to be located some distance away from the build-envelope to avoid conflict with objects under fabrication, and connected to the print-head via an umbilical tube. Umbilical feed lines may present reliability issues, particularly in the delivery of molten materials.

Thus, for fabricating solid objects it is advantageous to be able to employ a horizontal firing print-head configuration over a downward firing print-head as the hardware is simpler, more robust and inherently fail-safe. Thus there may be significant practical advantages to some embodiments of this invention which are capable of employing a horizontal firing print-head rather than a downward firing print-head.

It should be noted however, that an embodiment of the device does apply material from above the axis and many advantages are still retained.

A typical computer generated representation of the object to be fabricated is not suitable for instructing the device and thus needs to be "translated" into a form that is suitable for instructing the device. Embodiments of the device typically require that a three-dimensional computer model or representation of the object to be fabricated be first decomposed into a set of curved sections of the object. The sections typically are complementary in curvature to the cylindrical surface and thus may be described as cylindrical sections. Each section may correspond to an individually determined deposited layer of material to be applied by the applicator, the curved layers of applied material constituting the fabricated object. Example algorithms for performing this task are now described.

Figure 7:
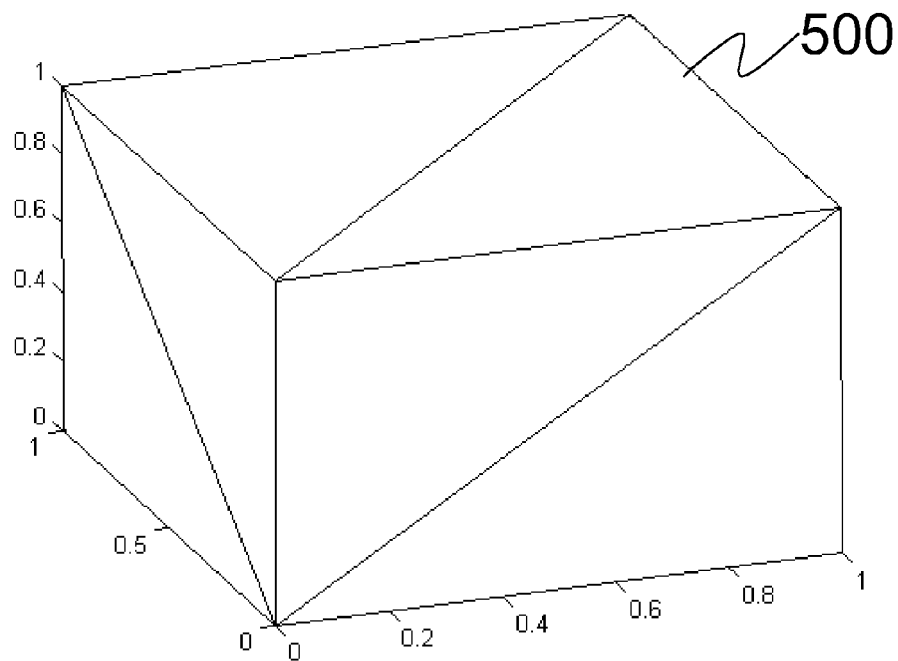
FIG. 7: shows an example of a surface-triangulated representation of a cube as used in the STL data format.
Figure 8:
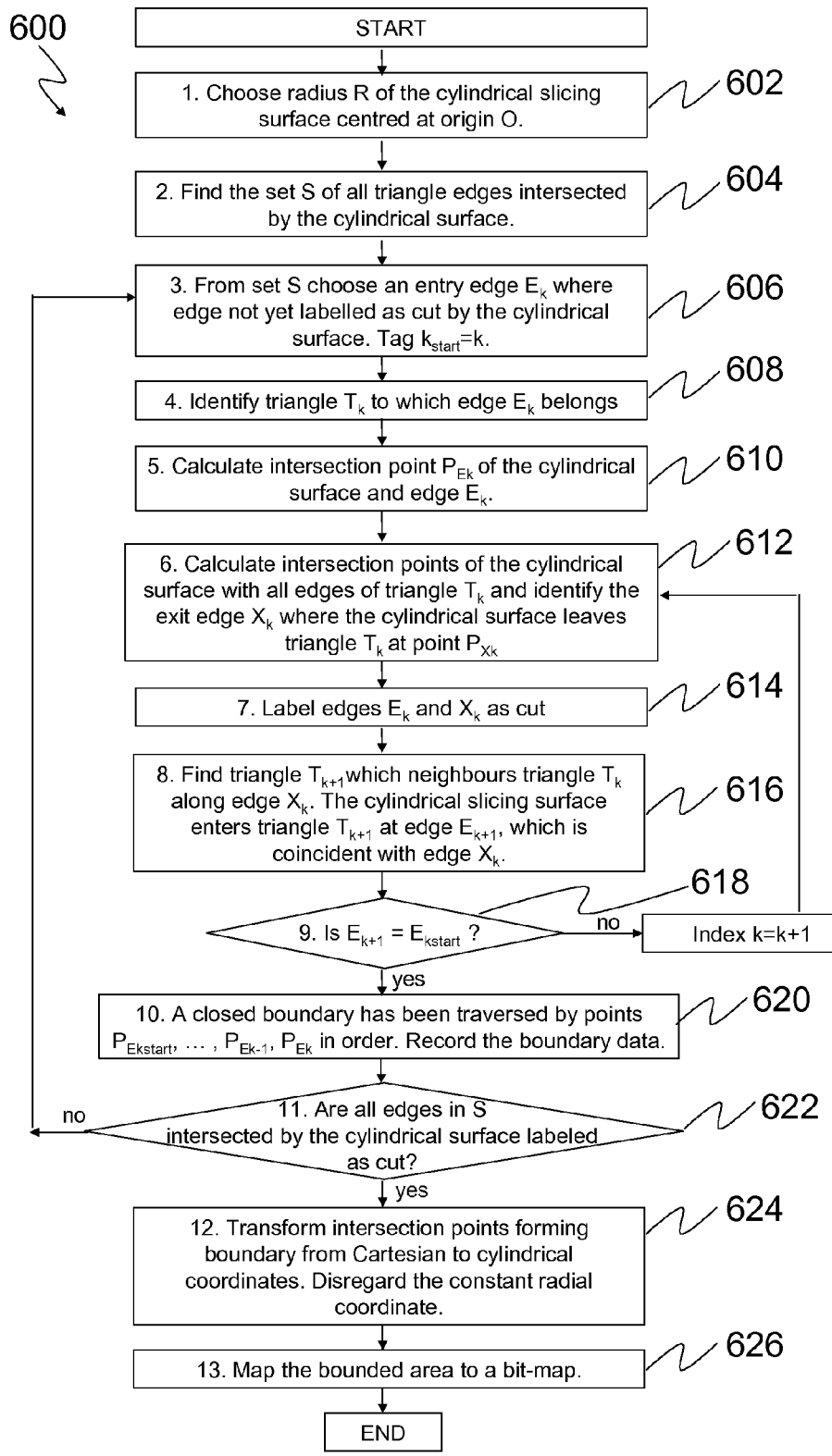
FIG. 8: shows a flow diagram of an embodiment of an algorithm for calculating cylindrical sections through an object represented by a surface triangulated data set in accordance with an aspect of the invention.
Figure 9:
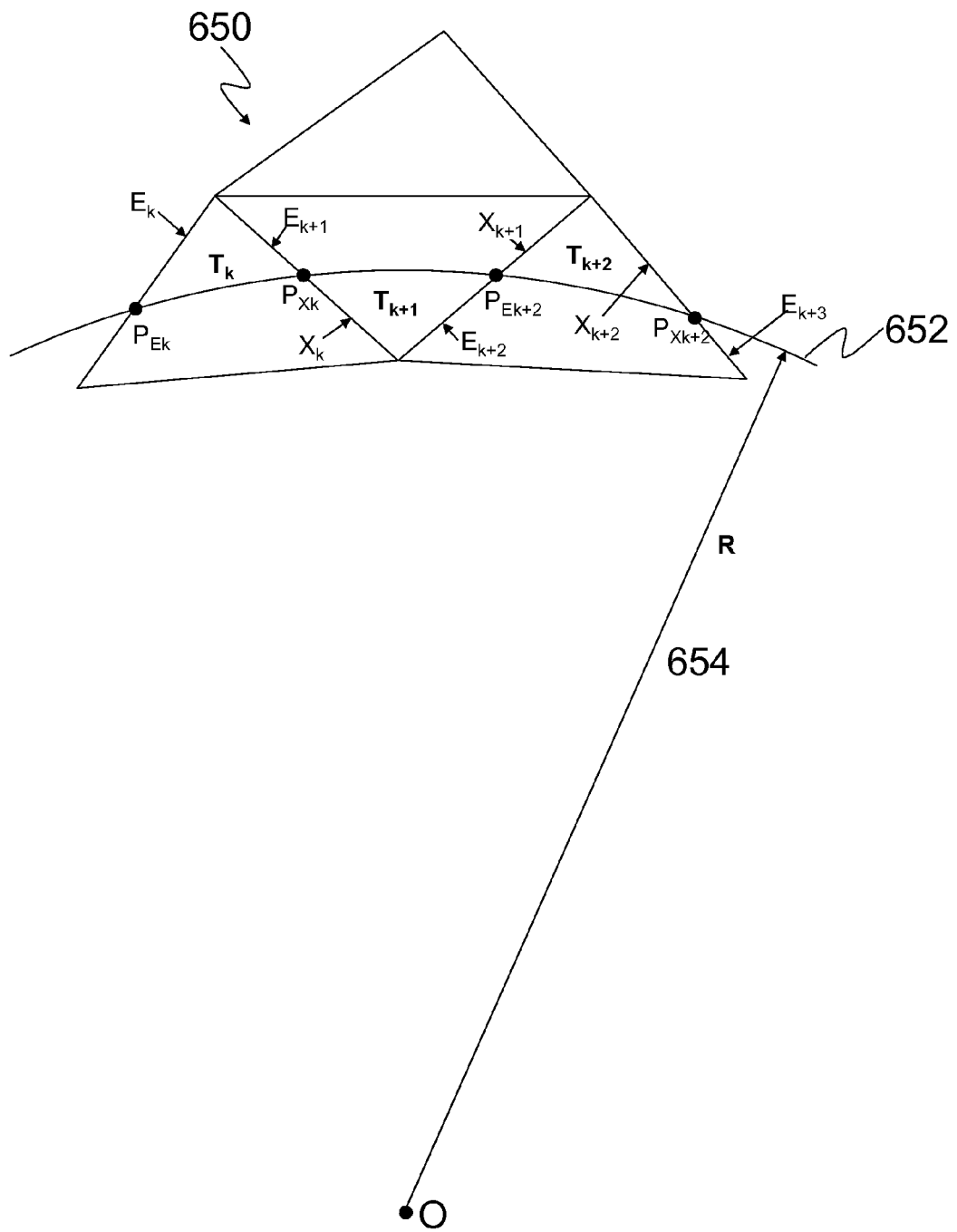
FIG. 9: shows an example of a section of a triangulated surface intersected by a cylindrical surface resulting in intersection points consistent with the algorithm presented in FIG. 8.

Some computer file formats represent the surfaces of solid objects as a triangulated mesh. FIG. 7 shows a representation of a cube 500 using a triangulated surface mesh. An example of a triangulated surface mesh file format is the STL file format. An embodiment of an algorithm for calculating a cylindrical section through such a triangulated surface data set is shown in FIG. 8 and generally indicated by the numeral 600. FIG. 9 illustrates the application of the algorithm to segments of a triangular mesh 650 showing the way an imaginary cylindrical surface 652 may be traced through the triangles by stepping between adjacent triangles as described. The algorithm requires in a first step 602 defining a radius R 654 of an imaginary cylindrical slicing surface 652 and its origin O relative to the triangulated surface data. Typically, the initial radius is taken to be equal (R1) to or slightly greater (R2) than the distance between the axis of rotation 122 and the surface 104. The representation of the solid object is located at least the distance R1 from the axis 122 for the algorithm such that none of the representation of the solid object lies within a region corresponding to that within the rotating cylinder 103, a region inaccessible to the applicator. Typically, but not always, the initial radius is taken to be around 0.1-5 mm greater than R1. The second step 604 involves finding the intersection of the cylindrical surface with triangle edges in the triangulated-surface data set. The third step 606 is to select one of the triangle edges that are intersected by the cylindrical surface that hasn't yet been labelled as 'cut' by the algorithm. The fourth step 608 involves identifying the triangle to which the selected edge belongs. The fifth step 610 involves calculating the intersection point of the cylindrical surface and the selected edge, which will be labelled as the 'entry' edge. The sixth step 612 involves calculating the intersection points of the cylindrical surface with all edges of the identified triangle. One of the intersected edges will contain a point at which the cylindrical surface exits the triangle; this edge will be labelled as the 'exit' edge. Note that the entry edge and the exit edge may be the same edge, and the entry point and the exit point may be coincident when the cylindrical surface is tangential to the edge. The seventh step 614 involves labelling the entry edge and exit edge as being 'cut' so that the algorithm can identify that these edges have already been traversed. The eighth step 616 involves finding the next triangle that neighbours the current triangle along its exit edge. This involves searching the set of triangles to find the pair of triangles sharing a common edge. The next triangle will have an edge adjacent to the current triangle, which by continuity will be the entry edge of the next triangle. In the ninth step 618, if the entry edge of the next triangle is not the same as the entry edge of the first entry edge then the 'next' triangle is labelled as the 'present' triangle and the algorithm returns to the fifth step 610 of the algorithm. However, if the edges are the same edge then a closed boundary of a cylindrical section (or 'contour') has been traversed and the points identified taken in order and joined by lines define the boundary and the area within the boundary is a section area. The tenth 620 step is then to record the points defining the boundary. The eleventh step 622 is conditional on whether all edges in the triangulated-surface data set that are intersected by the cylindrical surface have been labelled as cut. If not, then the algorithm returns to third step 606 and a starting edge for a new boundary of a section is chosen from the set of un-cut edges. In the twelfth step 624 the intersection points defining the cylindrical section's boundary are then expressed in cylindrical coordinates having a constant radial coordinate. Eliminating the radial coordinate so that points can be expressed in a reduced cylindrical coordinate system expressed as, for example, (theta, z) and having a constant radius, enables the intersection points to be computationally processed as points in a two dimensional (theta,z) space. Advantageously, in the reduced coordinate system, straight lines between consecutive intersection points correspond to a generally curved line that joins the corresponding points on the cylindrical surface. Straight lines are much easier to process than curved lines. If Cartesian coordinates were used instead of the reduced cylindrical coordinate system, multiple (x,y,z) points would be needed to represent the one curved line (instead of just the end points of the line as in the reduced system) which would be provide an inferior 'jagged' representation that would appear on the solid object. Fitting a curve to the Cartesian points may overcome their jagged appearance but at computational expense. Thus, the cylindrical section's boundary between the intersection points is expressed in the reduced cylindrical coordinate system. This greatly simplifies and speeds up further processing whilst reducing the size of memory needed. In the thirteenth step 626 the bounded area is mapped, being a function of only two variable coordinates, onto a two-dimensional bitmap in preparation for instructing the device to deposit material, and substance if used, in accordance with the calculated cylindrical section. The algorithm then terminates. The algorithm is repeated for different radii until the representation of the solid object has been fully sectioned. Thus by choosing a range of radii for cylindrical surfaces which span the triangulated-surface data set, the described algorithm can be used to determine the necessary cylindrical section boundaries and section areas through the triangulated representation. Each section corresponds to a layer of material to be applied.

In this but not necessarily all embodiments, there are a plurality of two-dimensional arrays of bits (bitmaps'). Each two-dimensional array of bits corresponds to a particular radial distance from the axis of rotation 122 and thus one cylindrical section. The bits represent points that are each the same radial distance from the axis of rotation. The bits are spaced apart by a constant arc length in the theta direction (around the axis 122) and another or the same constant distance in the z direction (along the axis 122). Thus, the number of bits in each array, in the theta direction, increases with radial distance to maintain the constant arc length. The plurality of arrays may be arranged in a stack, each layer in the stack corresponding to a layer of deposited material and/or substance. A '1' bit may indicate the deposition of material at the corresponding coordinate, while a '0' bit may indicate the deposition of substance at the corresponding coordinate. In some embodiments, a real number or other type of variable or data structure may be used instead of a bit to provide information about material mix or composition, material colour etc. The bit maps may be sent to the controller 144 for the purpose of instructing the device, or stored for later use.

Typically the triangles in the file are not in a convenient order for the algorithm. This algorithm may be enhanced by indexing the triangles before the algorithm commences to index edges belonging to each triangle and index which triangles are adjacent to each other. Thus the above algorithm is representative of an approach for calculating cylindrical sections through a triangulated mesh and is not restrictive of such improvements to the efficiency of the algorithm's execution.

Figure 10:
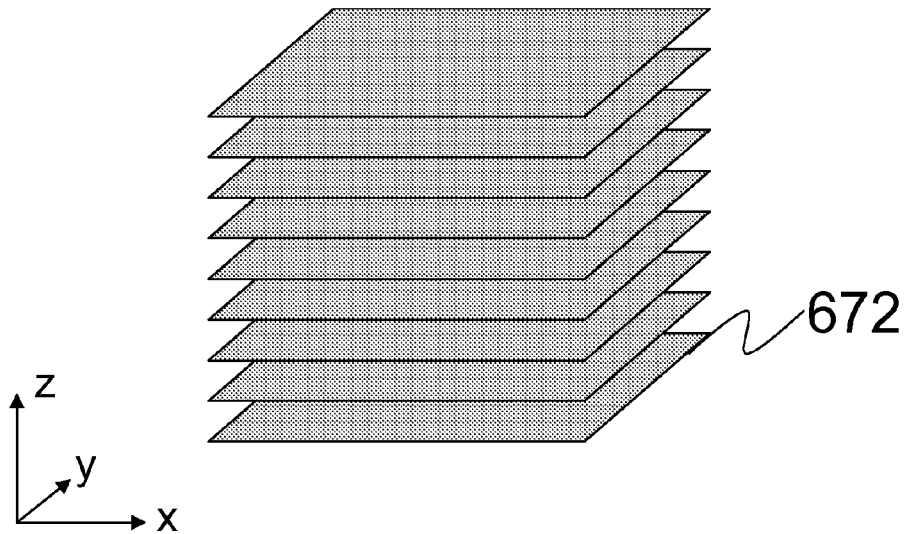
FIG. 10: shows an example of a cube represented as a plurality of sections.

A second example of a computer file format is the SLC format which represents a solid object as a series of spaced apart sections. The sections are defined by boundaries, each boundary enclosing a respective section area. Each section is in a respective plane (that is, the sections are planar sections) through the object. The boundary is typically expressed as a polygon. Each vertex of the polygon is typically expressed in rectilinear coordinates. The planar sections are typically at different heights through the object. The sections of a cube, for example, such as 672, are shown in FIG. 10. In one version of the SLC format the sections may be evenly spaced apart and are parallel to each other.

Figure 11:
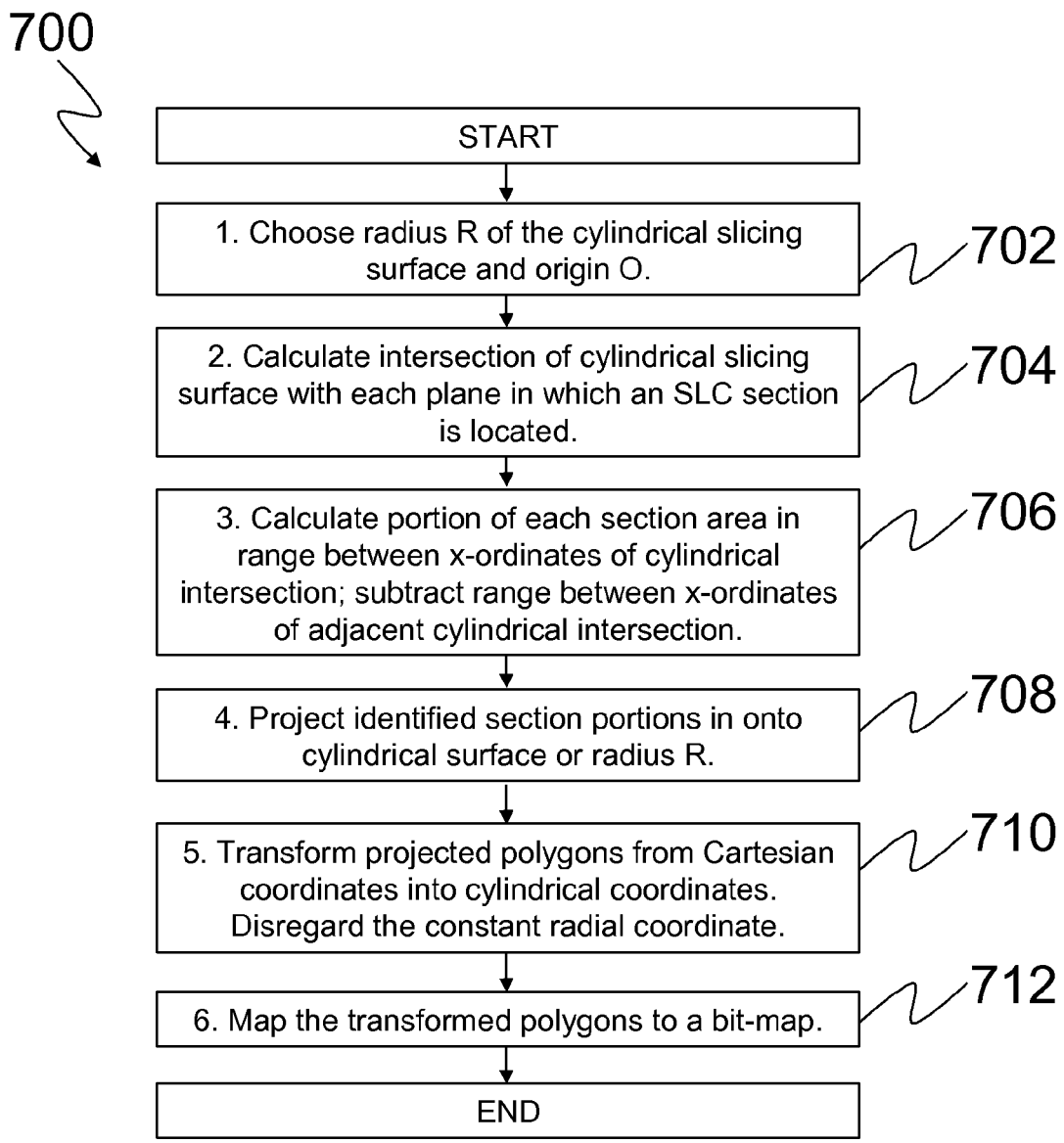
FIG. 11: shows a flow diagram of an embodiment of an algorithm for calculating cylindrical sections through an object represented by sections in accordance with an aspect of the invention.
Figure 12:
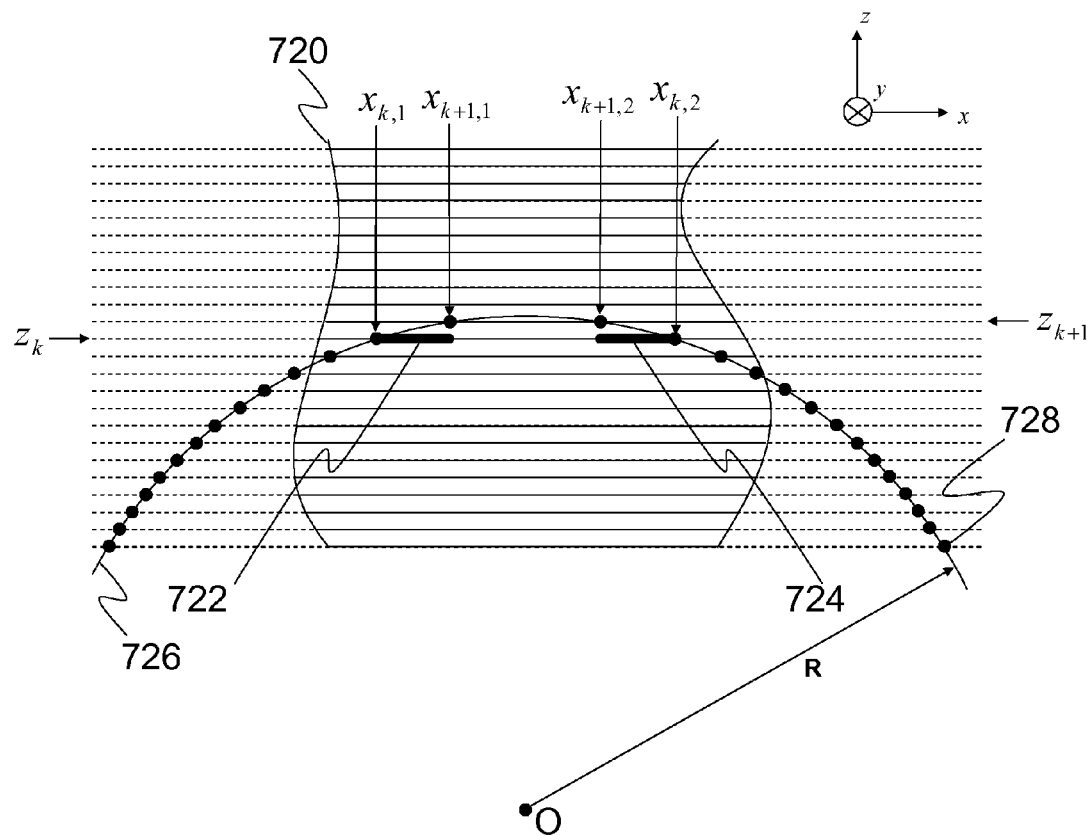
FIG. 12: shows an example of planar sections of an object intersected by a cylindrical surface.
Figure 13:
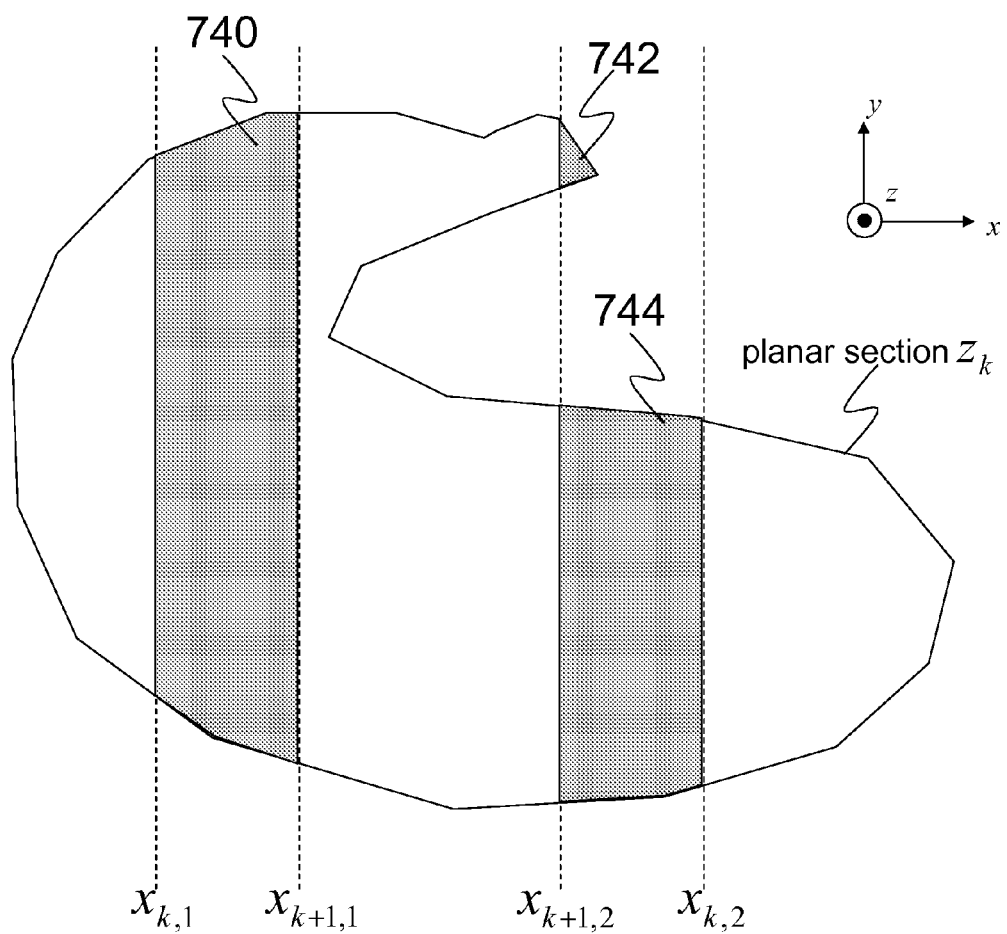
FIG. 13: shows an example of a planar section boundary intersected by a cylindrical surface and a neighbouring intersection.
Figure 14:
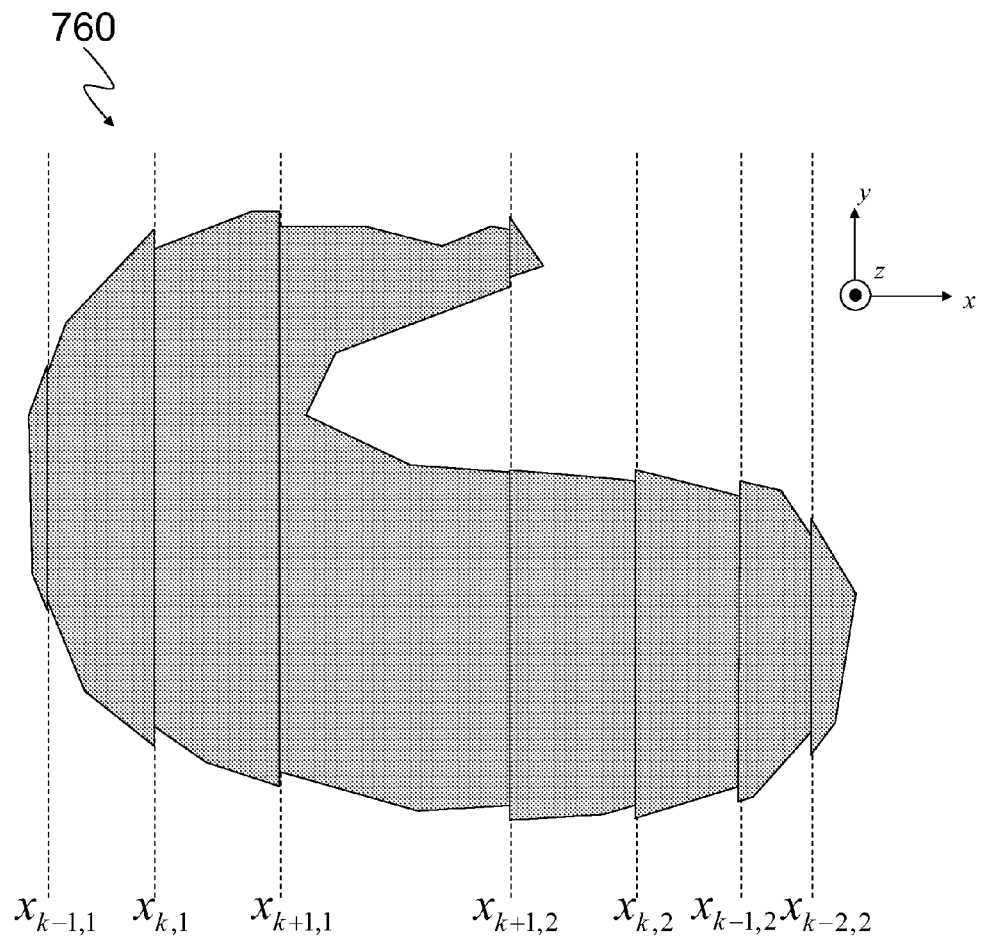
FIG. 14: shows the result of intersecting multiple section boundaries with a cylindrical surface.

An example of an algorithm for calculating a cylindrical section through an SLC dataset is shown in FIG. 11 and is generally indicated by the numeral 700. The algorithm converts a stack of planar sections representing an object (a representation highly suited to a Cartesian coordinate system, but not for the device shown in FIG. 1, for example) into a representation having cylindrical sections (curved layers). Cylindrical sections are well suited to the device shown in FIG. 1. In a preliminary step, the planar sections are each orientated such that the planes are stacked in a radial direction with respect to the cylindrical coordinate system. The procedure begins at step 702 by first defining the radius R of the imaginary cylindrical surface 726 and its origin O relative to the SLC data set, as illustrated in FIG. 12. The second step 704 involves calculating the intersections of the cylindrical surface with each of the planes in which a respective planar section is located, that is, at each z-level of the SLC data set. Each plane may be intersected along up to two lines by the cylindrical surface. For example, FIG. 12 shows an object 720 represented by stacked planar sections illustrated as solid lines stacked in the z-direction. The corresponding planes are illustrated as dashed lines. The plane at level $z_k$, for example, is intersected along lines parallel to the y-axis at two x-ordinates $x_{k,1}$ and $x_{k,2}$. The third step 706 requires calculating the portion of each planar section's area in the range between its respective intersecting ordinates and subtracting the range between the intersecting ordinates of an adjacent planar section. For example, referring to FIG. 12, the area portion at level $z_k$ discriminated in step 706 is that in the range between $x_{k,1}$ and $x_{k,2}$ minus the range between $x_{k+1,1}$ and $x_{k+1,2}$. In FIG. 12 with respect to the planar section at $z_k$, this corresponds to the range in x marked with bold lines and labelled 722 and 724. Viewed in the x-y plane as illustrated in FIG. 13, which shows another view of the planar section at $z_k$ from FIG. 12, the section portions correspond to the shaded regions labelled 740, 742 and 744. In a similar fashion, the section portion of every slice in the SLC data set can be calculated. This results in a set of section portions 760 as illustrated in FIG. 14. The fourth step 708 involves projecting each of the identified section portions in the z-direction onto the cylindrical slicing surface. This is done by projecting points on the boundary of each section portion which, when taken in order, define a polygon representing the section portion. This is achieved by applying the first transformation:

$$x'=x$$

$$y'=y$$

$$z'=\sqrt{R^2-x^2}$$

to the points, where the primed variables represent the transformed coordinates and the unprimed variables represent the original coordinates and R is the radius of the imaginary cylindrical slicing surface. The transformed points now lie on the imaginary cylindrical slicing surface. The fifth step 710 is to convert the transformed points in Cartesian coordinates to cylindrical coordinates via the second transformation:

$$\text{theta} = \arctan\left(\frac{z'}{x'}\right)$$

$$r = R$$

$$z = y'$$

where theta is the angular cylindrical coordinate, r is the radial cylindrical coordinate, and z is the axial cylindrical coordinate. Thus, polygons describing the specified cylindrical slice through the SLC data set are determined with a constant radial coordinate which may be discarded. In the sixth step 712 the transformed polygons' area is mapped, being a function of only two variable coordinates, onto a two-dimensional bitmap in preparation for instructing the device to deposit material, and substance if used, in accordance with the calculated cylindrical section. The algorithm then terminates.

The algorithm is repeated for different radii until the representation of the solid object has been fully sectioned. Thus by choosing a range of radii for the cylindrical slicing surfaces which span the SLC dataset, the described algorithm can be used to determine the necessary cylindrical sections.

It is to be noted that in step 706 the plane adjacent the planar section may be the upper plane or the lower plane. Slightly different cylindrical sections will ensue, though variation will be in the order of the layer thickness of the SLC data set and is therefore not typically significant.

It would be understood that the algorithms described above would need slight modification if used with respect to the device 950 shown in FIG. 18, for example. Such modifications may include positioning the representation of the object inside the surface 970 rather than outside the surface as described above in relation to the embodiment shown in FIG. 1.

Figure 15:
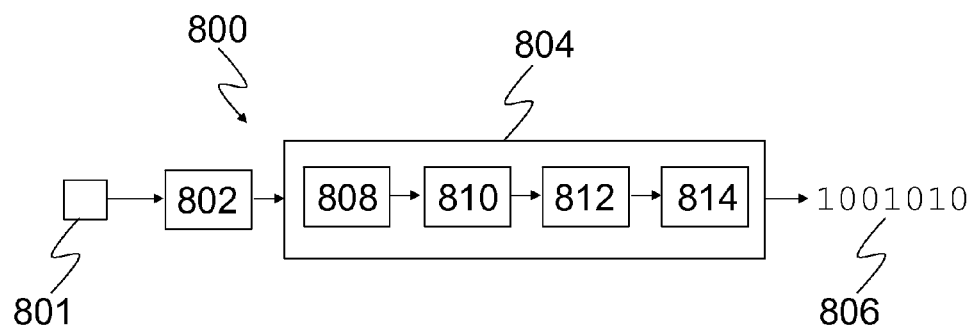
FIG. 15: shows a block diagram of one embodiment of a processor.

FIG. 15 shows a block diagram of an embodiment of a processor for determining instructions for a device for making solid objects, the processor being generally indicated by the numeral 800. The processor 800 has a receiver 802 for receiving information representing a solid object, typically in the form of a digital file 801, for example a STL or SLC file. The receiver may comprise an Ethernet port and associated circuity, a USB port, a CD or DVD drive etc. The received file is typically stored in a memory ready for processing. The processor also has a decomposer 804 that takes the information from the stored file and decomposes it into a plurality of data units 806. The plurality of data units may be indicative of an instruction to the device to apply or not apply a curved layer of material used to make the solid object. The decomposer may perform a method similar or identical to that shown in one or both of FIG. 8 or 11, for example. In general, the decomposer may be characterized as follows. The decomposer 804 may have a radius and position determiner 808 for determining a radius of the imaginary cylindrical surface, and a position of a central axis of the imaginary cylindrical surface relative to the representation of the solid object. The decomposer may have an intersection determiner 810 for calculating the one or more intersection(s) of the cylindrical surface with elements, such as triangles of planar sections, of the representation of the solid object. The decomposer may have an area generator 812 for determining an area using the intersection(s). The decomposer may have a mapper 814 for mapping the area to an array of data units, possibly in the form of a bitmap, in preparation for instructing the device to deposit material, and substance if used. The decomposer may be embodied as any suitable combination of hardware and software units, or may be purely embodied in hardware. Each of the units 808-814 may comprise one or more discrete hardware components having circuitry optimised for their function. Alternatively, the units 808-814 may be embodied as one or more software units instructing one, or possibly more, processor chips.

Variations and/or modifications may be made to the embodiments previously described without departing from the spirit or ambit of the invention. For example, the fabrication platform may not be cylindrical in shape but flat, and rotating around an axis, which is substantially parallel to the firing direction of the print-head (analogous to a record spinning on a record player). Thus the advantage of continuous printing may still be gained. In another embodiment the applicator may comprise nozzles for extruding material under pressure. The present embodiment is, therefore, to be considered in all respects as illustrative and not restrictive.

While prior art may be discussed herein, such discussion is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A device configured to make a solid object, the device comprising:
   a cylinder centered on an axis of rotation and being rotatable around the axis of rotation, the cylinder having a surface;
   an applicator that in use applies over at least one portion of the surface a material used to make the solid object, at least one of the applicator and the surface being displaceable in a direction transverse to the axis;
   a controller that in use receives instructions for making the solid object, the instructions being in the form of data indicative of a plurality of individually determined curved layers of material to be applied sequentially by the device, at least two of the layers having boundaries of different shape, and the controller in use coordinates rotation of the surface, displacement of the applicator relative to the surface, and the application of the material by the applicator, such that the plurality of layers of material are applied sequentially to form a stack of the plurality of layers on the at least one portion of the surface in accordance with the received instructions; and
   a shaper that in use shapes the material after application thereof;
   wherein the device in use is oriented such that the applicator ejects the material horizontally and rotates the surface in a single direction during the formation of at least a significant fraction of the solid object.

2. The device defined by claim 1 wherein, the applicator is further configured to apply a substance suitable to support the material.

3. The device defined by claim 1, wherein an angle made by the direction in which material is ejected from the applicator and the vertical is in the range of 75 degrees to 180 degrees.

4. The device defined by claim 1, oriented in use such that the applicator ejects the material in a horizontal plane that the axis of rotation lies in.

5. The device defined by claim 1, oriented in use such that the applicator is located at the horizontal plane.

6. The device defined by claim 1 configured such that the surface continuously rotates during formation of at least a significant fraction of the solid object.

7. The device defined by claim 1, wherein the surface is curved.

8. The device defined by claim 1, wherein at least one of the applicator and the surface are displaceable in a direction parallel with the axis.

9. The device defined by claim 1, comprising a servo motion control system configured to control rotation of the surface around the axis.

10. The device defined by claim 1, comprising an encoder for determining the rotational orientation of the cylindrical platform.

11. The device defined by claim 1, wherein the applicator is configured to apply the material, which is one of: a photo-curable fluid; a phase change material; and a combination of a photo-curable fluid and phase change material.

12. The device defined by claim 1, wherein the surface is compatible with at least one of the material and the substance.

13. The device defined by claim 1, comprising a light source illuminating at least some of the surface, the light having characteristics suitable for the curing of a photo-curable fluid.

* * * * *